(12) United States Patent
Tian et al.

(10) Patent No.: US 10,717,527 B2
(45) Date of Patent: Jul. 21, 2020

(54) UAV ARM MECHANISM AND UAV

(71) Applicant: Yuneec International (China) Co.,Ltd, Kunshan, Jiangsu (CN)

(72) Inventors: Yu Tian, Jiangsu (CN); Wenyan Jiang, Jiangsu (CN)

(73) Assignee: Yuneec International (China) Co., Ltd, Kunshan, Jiangsu (CN)

( * ) Notice: Subject to any disclaimer, the term of this patent is extended or adjusted under 35 U.S.C. 154(b) by 277 days.

(21) Appl. No.: 15/955,655

(22) Filed: Apr. 17, 2018

(65) Prior Publication Data
US 2018/0237139 A1 Aug. 23, 2018

(30) Foreign Application Priority Data
Apr. 18, 2017 (CN) .......................... 2017 1 0251326

(51) Int. Cl.
*B64C 39/02* (2006.01)
*B64C 1/06* (2006.01)
*B64C 27/08* (2006.01)
*B64C 27/37* (2006.01)

(52) U.S. Cl.
CPC ............ *B64C 39/024* (2013.01); *B64C 1/063* (2013.01); *B64C 27/08* (2013.01); *B64C 27/37* (2013.01); *B64C 2201/024* (2013.01); *B64C 2201/108* (2013.01); *B64C 2201/20* (2013.01)

(58) Field of Classification Search
CPC ....... B64C 39/024; B64C 27/37; B64C 27/08; B64C 1/063; B64C 2201/108; B64C 2201/024; B64C 2201/20; B64C 1/30
See application file for complete search history.

(56) References Cited

U.S. PATENT DOCUMENTS

| 1,927,966 | A | * | 9/1933 | Vaughn | B64C 27/37 416/107 |
| 2005/0166413 | A1 | * | 8/2005 | Crampton | B25J 13/088 33/503 |
| 2019/0276140 | A1 | * | 9/2019 | Poltorak | B64C 39/024 |
| 2019/0369057 | A1 | * | 12/2019 | Mattar | B64D 47/00 |

* cited by examiner

*Primary Examiner* — Valentina Xavier

(57) ABSTRACT

A UAV (unmanned aerial vehicle) arm mechanism includes an arm fixed device, a control device, a limiting device, and an arm connecting device, wherein the control device is adapted for controlling an assembly and disassembly of the arm fixed device and the arm connecting device, the limiting device is adapted for relatively fixing the arm fixed device and the arm connecting device; the control device is adapted for driving the limiting device to be detached from the arm connecting device, so as to achieve that the arm fixed device and the arm connecting device switch among at least three different states through a relative rotation. The UAV and the UAV arm mechanism can be locked up through the positioning pins, and also can be folded and disassembled after pressing the controlling device.

9 Claims, 5 Drawing Sheets

UAV ARM MECHANISM AND UAV

CROSS REFERENCE OF RELATED APPLICATION

The present invention claims priority under 35 U.S.C. 119(a-d) to CN 201710251326.5, filed Apr. 18, 2017.

BACKGROUND OF THE PRESENT INVENTION

Field of Invention

The present invention relates to the technical field of UAV (unmanned aerial vehicle) equipment, and more particularly to a UAV arm mechanism and a UAV.

Description of Related Arts

In recent years, with the rise of UAVs (unmanned aerial vehicles) and the rapid development of related aircraft models and UAV technologies, UAVs have also been used in more and more occasions. During the process, more and more people have begun to contact UAVs, so that UAVs have entered the civilian entertainment field from the professional and scientific fields.

Unmanned aerial vehicle is abbreviated as "UAV", which is an unmanned aircraft operated by radio remote control equipment and self-contained program control equipment. UAVs can be divided into military UAVs and civilian UAVs according to application areas. In many civilian UAVs, there are more aerial four-axis and aerial six-axis UAVs. UAVs generally comprise an arm structure which extends outwardly from a fuselage, and a propeller is mounted on the arm structure for power generation. After the arm structure expands, it occupies a relatively large volume of space volume, so the arm structure is often fixed with the fuselage through the bolt structure so as to ensure certain strength requirements. However, the above-mentioned structure has problems that the disassembly and assembly of the arm structure requires external tools, and the process is cumbersome, so that the entire disassembly and assembly process takes more time, thereby reducing the customer experience.

In addition, under some specific usage scenarios, for example, when the UAV is not used for a short time and needs to be stored, the user does not want to spend more time in disassembling the arm structure, but hopes that the arm structure can be folded and stored when not in use to reduce the space occupied by the UAV during storage and transportation.

Therefore, it is necessary to design an improved arm structure that can overcome the above-mentioned problems.

SUMMARY OF THE PRESENT INVENTION

An object of the present invention is to provide a UAV (unmanned aerial vehicle) arm mechanism and a UAV, so as to resolve the above-mentioned problems.

To achieve the object, technical solutions of the present invention are achieved as follows.

A UAV arm mechanism comprises an arm fixed device, a control device, a limiting device, and an arm connecting device, wherein:

the control device is adapted for controlling an assembly and disassembly of the arm fixed device and the arm connecting device, the limiting device is adapted for relatively fixing the arm fixed device and the arm connecting device;

the control device is adapted for driving the limiting device to be detached from the arm connecting device, so as to achieve that the arm fixed device and the arm connecting device switch among at least three different states through a relative rotation, wherein:

in a first state, the arm fixed device is in angled bending connection with the arm connecting device, the limiting device locks up a first relative position between the arm fixed device and the arm connecting device;

in a second state, the arm fixed device and the arm connecting device are connected and distributed along a straight line, the limiting device locks up a second relative position between the arm fixed device and the arm connecting device;

in a third state, the arm fixed device and the arm connecting device are detached from each other.

Preferably, the limiting device comprises a center pin for leaning against the control device and a spring sleeved to the center pin, wherein both the arm fixed device and the arm connecting device relatively rotate around an axis of the center pin.

More preferably, the limiting device further comprises two positioning pins and a bottom plate, wherein the positioning pins and the center pin are disposed on the bottom plate in parallel.

Preferably, the arm fixed device and the arm connecting device respectively have first positioning pin holes and second positioning pin holes, wherein the positioning pins are inserted into the first positioning pin holes and the second positioning pin holes for locking up positions.

Preferably, the control device is adapted for driving the center pin to move along an axis thereof, so as to respectively detach the two positioning pins from the two first positioning pin holes, the spring is adapted for driving the two positioning pins along the axis of the center pin to be respectively inserted into the two first positioning pin holes.

Preferably, the arm fixed device comprises a positioning plate which has a first central hole.

Preferably, an amount of the first central hole of the positioning plate is one; an amount of the first positioning pin holes of the positioning plate is two, the first positioning pin holes are respectively provided at two opposite sides of the first central hole of the positioning plate.

Preferably, the arm connecting device comprises at least two rotating plates, wherein each of the rotating plates has a central hole, a slot is provided between the central hole and a plate edge of each of the rotating plates for disassembly.

Preferably, the first central hole of the positioning plate has a flat square shape, and the mounting plate has a central opening which is flat square shaped.

Preferably, the first central hole of the positioning plate is consistent with the central opening of the mounting plate in shape, and the positioning plate and the mounting plate are disposed at a certain distance along an axis of the central opening.

Preferably, the rotating plates are a first rotating plate and a second rotating plate, the first rotating plate has a second central hole, the second rotating plate has a third central hole and second positioning pin holes;

after relatively rotating a certain angle, the second positioning pin holes of the second rotating plate of the arm connecting device are respectively corresponding to the first positioning pin holes of the positioning plate of the arm fixed device along the axis direction.

Also, the present invention provides a UAV which comprises a UAV body and a UAV arm mechanism fixed to the UAV body.

Compared with the prior art, the present invention has advantages as follows:

The UAV arm mechanism provided by the present invention comprises the arm fixed device, the control device, the limiting device, and the arm connecting device;

the control device is adapted for driving the limiting device to be detached from the arm connecting device, so as to achieve that the arm fixed device and the arm connecting device switch among at least three different states through a relative rotation, wherein:

in the first state, after pressing the control device, the relative position of the arm connecting device to the arm fixed device is rotated for driving the limiting device to be inserted into the arm fixed device, to form pin hole cooperation, thus locking up the arm connecting device and the arm fixed device;

in the second state, after pressing the control device, the arm connecting device and the arm fixed device are connected and disposed along a straight line, the limiting device locks up the relative position of the arm connecting device to the arm fixed device;

in the third state, after pressing the control device, the relative position of the arm connecting device to the arm fixed device is rotated to detach the limiting device from the arm fixed device, so as to relieve the pin hole cooperation, for further relieve the locking of the arm connecting device and the arm fixed device, to relatively rotate the arm connecting device and the arm fixed device.

BRIEF DESCRIPTION OF THE DRAWINGS

In order to more clearly describe the specific embodiments of the present invention or the technical solutions in the prior art, the drawings used in the description of the specific embodiments or the prior art will be simply described below. Obviously, the drawings in the following description are some embodiments of the present invention. For those skilled in the art, other drawings may also be obtained based on these drawings without any creative work.

Figure 1:
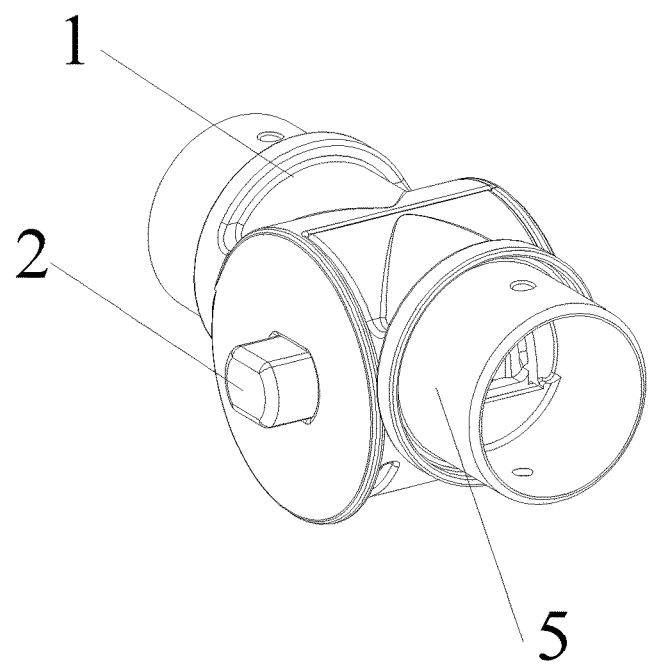
FIG. 1 is a structurally schematic diagram of a UAV (unmanned aerial vehicle) arm mechanism in a usage state according to a preferred embodiment of the present invention.

In the drawings, 1: arm fixed device; 11: fixed body; 12: mounting plate; 13: positioning plate; 14: central opening; A: first central hole; B: first positioning pin hole; 2: control device; 21: flange; 22: cylindrical body; 3: limiting device; 31: bottom plate; 32: center pin; 33: positioning pin; 34: spring; 4: rear block cover; 5: arm connecting device; 51: base; 52: first rotating plate; 53: second rotating plate; C: second central hole; D: third central hole; E: second positioning pin hole; 521: first slot; 531: second slot.

DETAILED DESCRIPTION OF THE PREFERRED EMBODIMENT

Technical solutions of the present invention will be clearly and completely described with accompanying drawings as follows. Obviously, the described embodiments are some but not all of the embodiments of the present invention. All other embodiments obtained by one skilled in the art based on the embodiments of the present invention without creative efforts shall fall within the protective scope of the present invention.

In the description of the present invention, it should be noted that the term "connected" should be interpreted broadly unless specifically defined or limited. For example, it may be a fixed connection, a detachable connection, or an integral connection; it may be a mechanical connection or an electrical connection; it may be directly connected, indirectly connected through an intermediary, or an internal communication between two components. For one skilled in the art, the specific meanings of the above term in the present invention can be understood in accordance with specific situations.

The present invention is further explained with specific embodiments and accompanying drawings in detail as follows.

Referring to FIGS. 1 to 5, a UAV (unmanned aerial vehicle) arm mechanism according to a preferred embodiment of the present invention is illustrated, which is able to be quickly assembled and disassembled and relatively folded at the same time.

Specifically, the UAV arm mechanism comprises an arm fixed device 1, a control device 2, a limiting device 3, a rear block cover 4 and an arm connecting device 5. Under an action of the control device 2, there are multiple different relative position states between the arm fixed device 1 and the arm connecting device 5. According to the preferred embodiment of the present invention, the UAV arm mechanism has three different states as follows.

Figure 2:
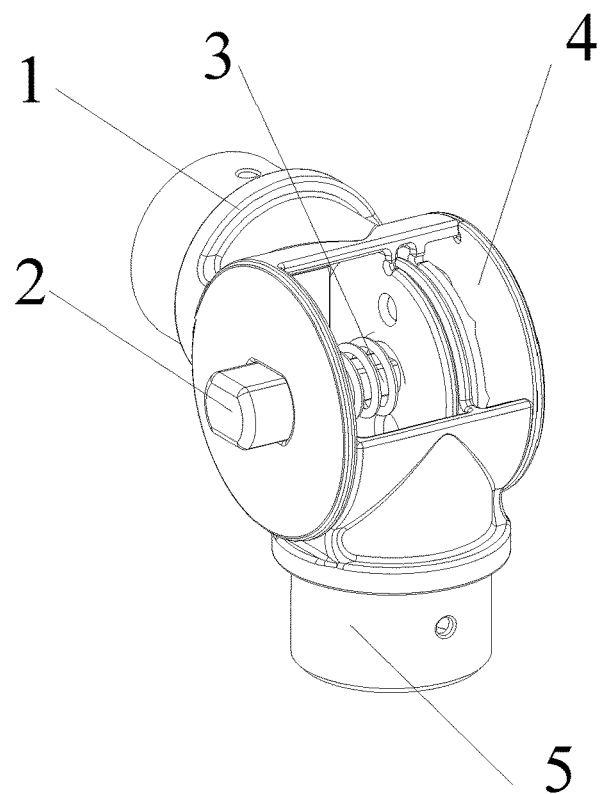
FIG. 2 is a structurally schematic diagram of the UAV arm mechanism in a folded state according to the preferred embodiment of the present invention.

In the first state, the arm fixed device 1 and the arm connecting device 5 are connected by being folded at an angle of 90 degrees therebetween. At this time, the UAV arm mechanism is in a folded state with a relatively small overall volume, which is convenient to be stored in a limited-size toolkit for transportation, as shown in FIG. 2. Of course, in different embodiments, the angle between the arm fixed device 1 and the arm connecting device 5 in the first state is able to be other angles, such as 30, 45, and 60 degrees.

In the second state, the arm fixed device 1 and the arm connecting device 5 are connected by forming an angle of 180 degrees therebetween, that is, the arm fixed device 1 and the arm connecting device 5 are distributed along a substantial same straight line, so that the UAV arm mechanism is fully expanded and occupies a larger volume for facilitating the flight of the UAV (as shown in FIG. 1).

Figure 3:
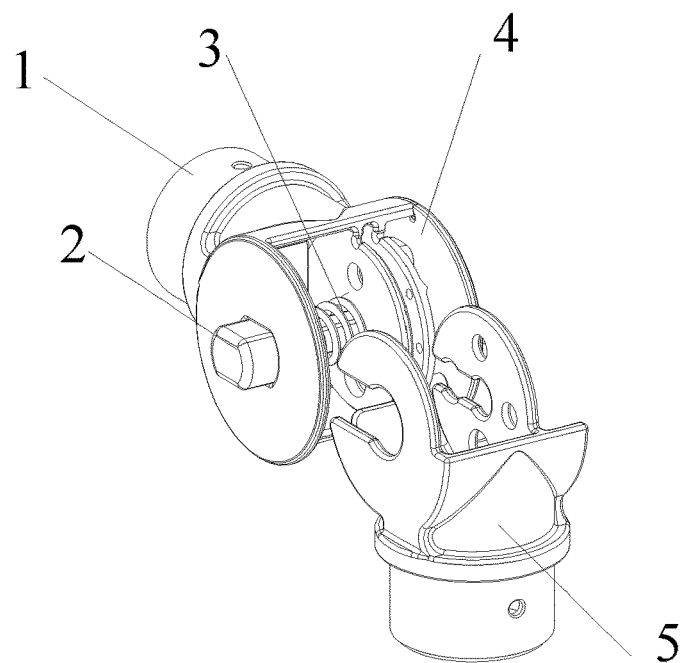
FIG. 3 is a structurally schematic diagram of the UAV arm mechanism in a disassembled state according to the preferred embodiment of the present invention.
Figure 4:
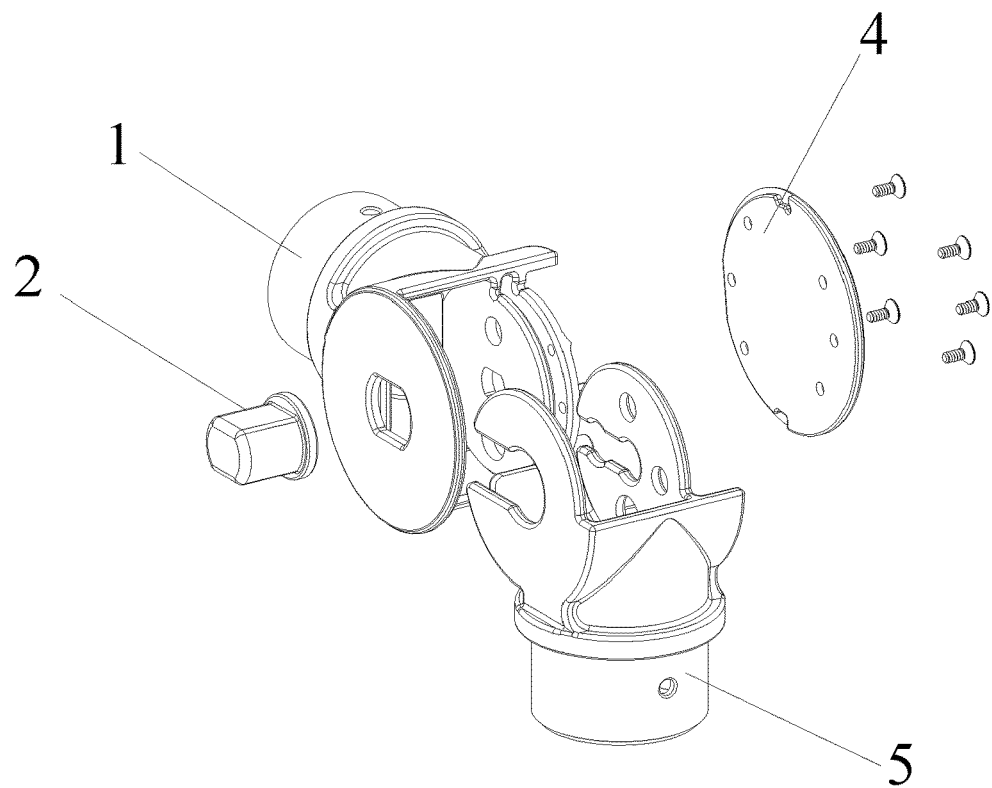
FIG. 4 is a partially exploded view of the UAV arm mechanism shown in FIG. 3.
Figure 5:
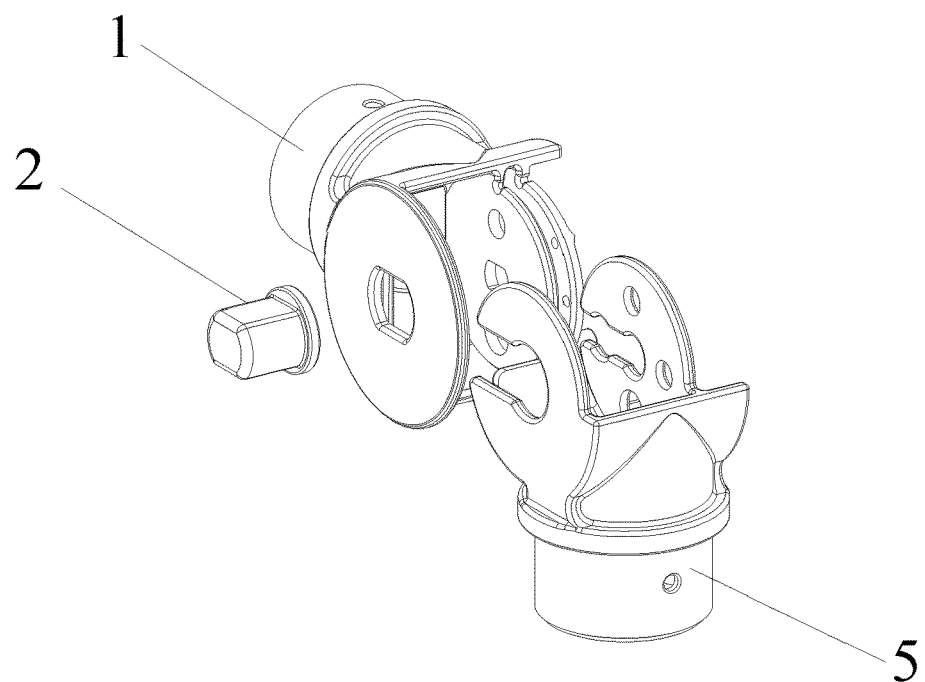
FIG. 5 is another partially exploded view of the UAV arm mechanism shown in FIG. 3.

In the third state, the arm fixed device 1 and the arm connecting device 5 are detached from each other (as shown in FIG. 3).

Figure 6:
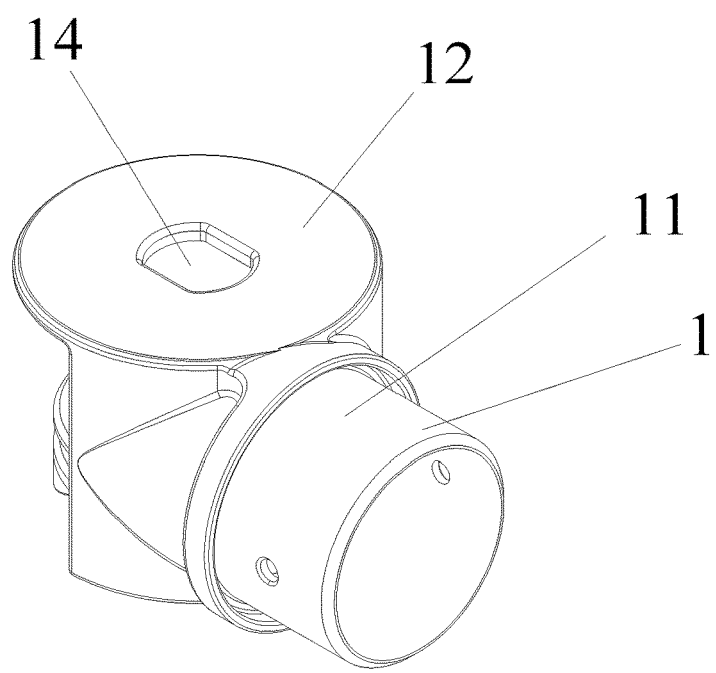
FIG. 6 is a structurally schematic view of an arm fixed device of the UAV arm mechanism at a visual angle according to the preferred embodiment of the present invention.
Figure 7:
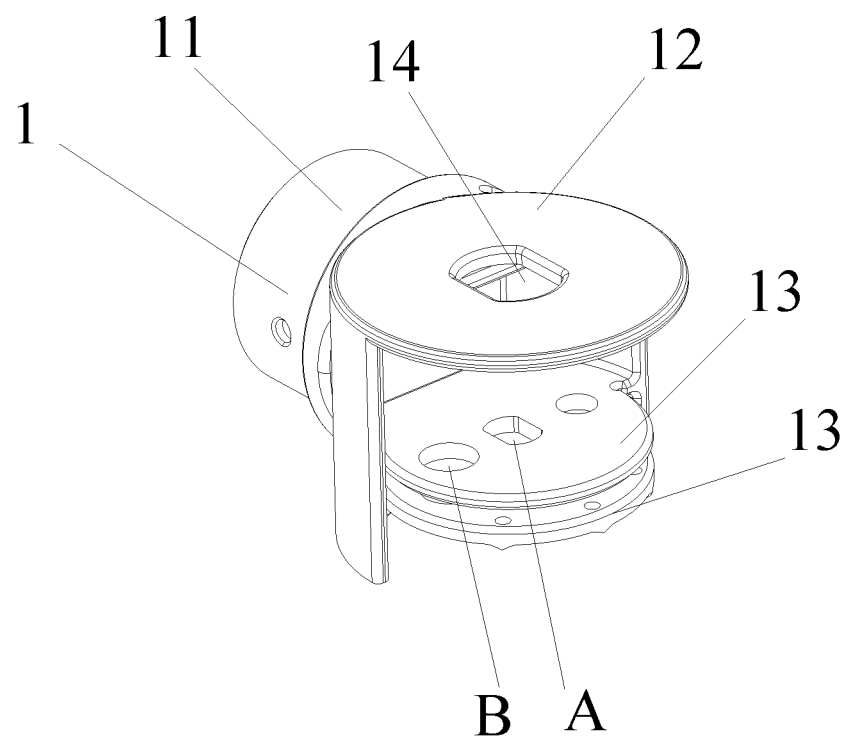
FIG. 7 is a structurally schematic view of the arm fixed device of the UAV arm mechanism at another visual angle according to the preferred embodiment of the present invention.

Referring to FIGS. 6 and 7, the arm fixed device 1 comprises a fixed body 11, a mounting plate 12 and two positioning plates 13 both of which are for providing positioning. The mounting plate 12 and the two positioning plates 13 are arranged in parallel, and the mounting plate 12 and the two positioning plates 13 of the arm fixed device 1 and the rear block cover 4 are arranged in sequence. The mounting plate 12 has a central opening 14 for accommodating the control device 2. The control device 2 is able to move along an axis direction of the central opening 14 to perform an operation of the UAV arm mechanism.

Figure 8:
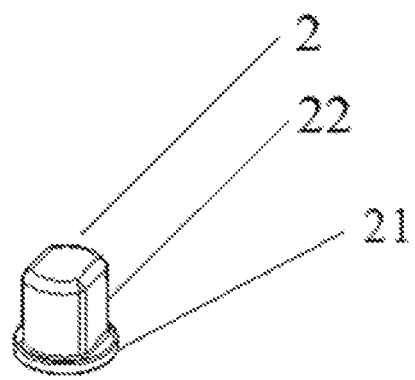
FIG. 8 is a structurally schematic view of a control device of the UAV arm mechanism according to the preferred embodiment of the present invention.

The control device 2 is inserted into the mounting plate 12. Moreover, as shown in FIG. 8, the control device 2 comprises a cylindrical body 22 and a flange 21 which is set at one end of the cylindrical body 22. When the control device 2 is fitted with the mounting plate 12, the flange 21 is able to lean against an inner side of the mounting plate 12, so as to prevent the control device 2 from being detached from the mounting plate 12. In addition, to avoid assembly errors, the cylindrical body 22 of the control device 2 is preferably set to a flat square shape.

In the arm fixed device 1, the mounting plate 12 and the two positioning plates 13 are disposed at a certain distance along the axis direction of the central hole 14. Each of the two positioning plates 13 has a first central hole A and two first positioning pin holes B which are respectively provided at two opposite sides of the first central hole A. It should be noted that the first central hole A has a flat square shape which is consistent with the central hole 14 of the mounting plate 12 in shape.

Figure 10:
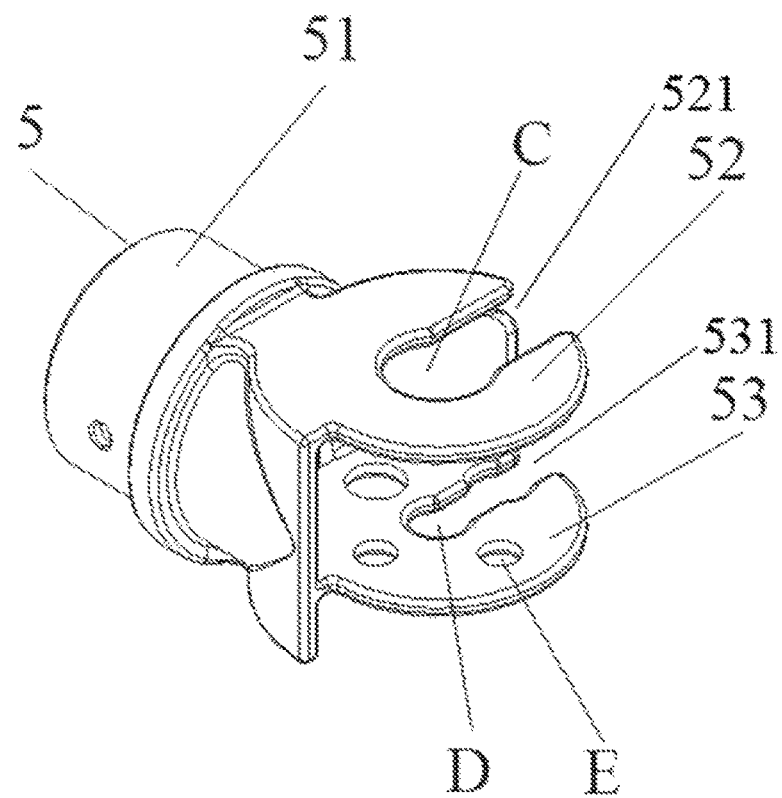
FIG. 10 is a structurally schematic view of an arm connecting device of the UAV arm mechanism according to the preferred embodiment of the present invention.

Referring to FIG. 10, the arm connecting device 5 comprises a base 51 and at least two rotating plates which are disposed at a top portion of the base 51 and are arranged with each other in parallel, namely, a first rotating plate 52 and a second rotating plate 53. The first rotating plate 52 has a second central hole C, a first slot 521 is provided between the second central hole C and a plate edge of the first rotating plate 52; the second rotating plate 53 has a third central hole D and four second positioning pin holes E, a second slot 531 is provided between the third central hole D and a plate edge of the second rotating plate 53. Preferably, an amount of the third central hole D is one, and an amount of the second positioning pin holes E is multiple.

Figure 9:
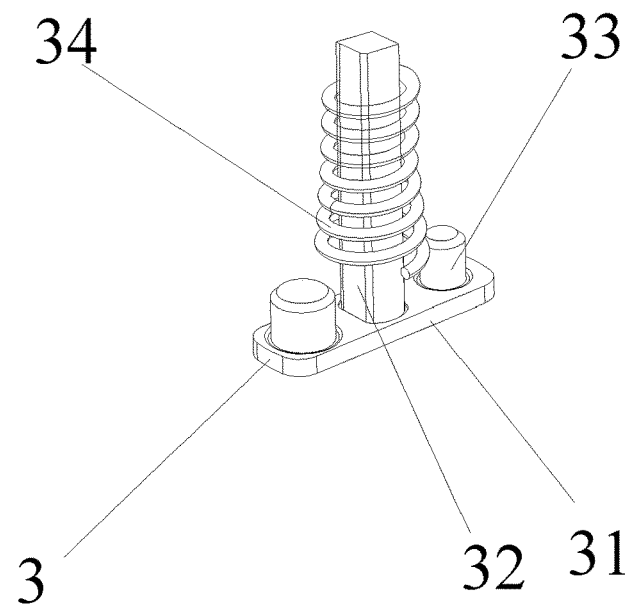
FIG. 9 is a structurally schematic view of a limiting device of the UAV arm mechanism according to the preferred embodiment of the present invention.

Referring to FIG. 9, the limiting device 3 comprises a bottom plate 31, a center pin 32, two positioning pins 33 and a spring 34 three of which are disposed on the bottom plate 31. The control device 2 is adapted for driving the center pin 32 to move along an axis thereof, so as to respectively detach the two positioning pins 33 from the two first positioning pin holes B. The spring 34 is adapted for driving the two positioning pins 33 along the axis of the center pin 32 to be respectively inserted into the two first positioning pin holes B. The center pin 32 of the limiting device 3 passes through the third central hole D of the second rotating plate 53 of the arm connecting device 5, and the first central holes A of the two positioning plates 13 in sequence. A top end of the center pin 32 of the limiting device 3 is fitted with the control device 2, a gap is provided between the bottom plate 31 of the limiting device 3 and the rear block cover 4 for moving the rear block cover 4. The spring 34 is sleeved to the center pin 32 which is located between the mounting plate 12 and the two positioning plates 13.

The specific structure and technical effect of the UAV arm mechanism according to the preferred embodiment of the present invention are described in detail as follows.

After relatively rotating a certain angle, the second positioning pin holes E of the second rotating plate 53 of the arm connecting device 5 are respectively corresponding to the first positioning pin holes B of the positioning plates 13 of the arm fixed device 1 along the axis direction.

It should be noted that as long as the above technical requirements are met, the three main working conditions of the above-mentioned UAV arm mechanism are able to be implemented, which are respectively: (1) the usage state: the button is pressed, the connecting device is quickly rotated, the fixed device is inserted and then upwardly rotate 90° till hearing the "Ka" sound, so that the installation is completed; (2) the folded state: the button is pressed, the connecting device is downwardly rotated downwardly rotate 90° to enter the folded state; (3) the quickly disassembled state: the button is pressed, the connecting device is backwardly removed to complete the quickly disassembled state.

Accordingly, the present invention also provides a UAV (unmanned aerial vehicle), which comprises a UAV body and a UAV arm mechanism fixed to the UAV body.

The UAV arm mechanism according to the preferred embodiment of the present invention has advantages as follows.

(1) The UAV arm mechanism provided by the present invention comprises the arm fixed device, the control device, the limiting device, the rear block cover and the arm connecting device. The UAV arm mechanism has three states, namely, the usage state, the folded state and the disassemble state.

In the usage state, the arm fixed device is unable to relatively rotate to the arm connecting device due to the inserted limiting device, so as to achieve locking up; at the same time, the arm fixed device and the arm connecting device are set along the same straight line.

In the folded state, the control device is pressed, the positioning pins are be detached from the positioning pin holes, so as to dissolve the fitting relationship between the arm fixed device and the arm connecting device; at this time, the arm fixed device and the arm connecting device are able to freely relatively rotate, so as to further quickly fold for 90 degrees.

In the disassemble state, that is, after pressing the control device, the arm connecting device is backwardly removed to complete the disassembled state.

(2) In the UAV arm mechanism and the UAV provided by the present invention, specific components, connection relationships, position relationships and component arrangement are specifically designed, which improves the system architecture. Compared with the traditional UAV arm mechanism, the UAV arm mechanism provided by the present invention has higher disassembly convenience, structural stability and reliability.

Based on the above significant technical advantages, the UAV arm mechanism and the UAV provided by the present invention will surely bring about good market prospects and economic benefits.

Finally, it should be noted that the above embodiments are only used to illustrate the technical solutions of the present invention, rather than limiting the technical solutions of the present invention; although the present invention has been described in detail with reference to the foregoing embodiments, those skilled in the art should understand that: it is still possible to modify the technical solutions described in the foregoing embodiments or equivalently replace some or all of the technical features; and these modifications or replacements do not deviate the essence of the corresponding technical solutions from the scope of the technical solutions of the embodiments of the present invention.

What is claimed is:

1. A UAV (unmanned aerial vehicle) arm mechanism comprising: an arm fixed device, a control device, a limiting device, and an arm connecting device, wherein:
the control device is adapted for controlling an assembly and disassembly of the arm fixed device and the arm connecting device, the limiting device is adapted for relatively fixing the arm fixed device and the arm connecting device;
the control device is adapted for driving the limiting device to be detached from the arm connecting device, so as to achieve that the arm fixed device and the arm connecting device switch among at least three different states through a relative rotation, wherein:
in a first state, the arm fixed device is in angled bending connection with the arm connecting device, the limiting device locks up a first relative position between the arm fixed device and the arm connecting device;
in a second state, the arm fixed device and the arm connecting device are connected and distributed along a straight line, the limiting device locks up a second relative position between the arm fixed device and the arm connecting device;
in a third state, the arm fixed device and the arm connecting device are detached from each other.

2. The UAV arm mechanism, as recited in claim 1, wherein the limiting device comprises a center pin for leaning against the control device and a spring sleeved to the center pin, wherein both the arm fixed device and the arm connecting device relatively rotate around an axis of the center pin.

3. The UAV arm mechanism, as recited in claim 2, wherein the limiting device further comprises two positioning pins and a bottom plate, wherein the positioning pins and the center pin are disposed on the bottom plate in parallel.

4. The UAV arm mechanism, as recited in claim 3, wherein the arm fixed device and the arm connecting device respectively have first positioning pin holes and second positioning pin holes, wherein the positioning pins are inserted into the first positioning pin holes and the second positioning pin holes for locking up positions.

5. The UAV arm mechanism, as recited in claim 4, wherein the control device is adapted for driving the center pin to move along an axis thereof, so as to respectively detach the two positioning pins from the two first positioning pin holes, the spring is adapted for driving the two positioning pins along the axis of the center pin to be respectively inserted into the two first positioning pin holes.

6. The UAV arm mechanism, as recited in claim 4, wherein the arm fixed device comprises a positioning plate which has a first central hole;
an amount of the first central hole of the positioning plate is one; an amount of the first positioning pin holes of the positioning plate is two, the first positioning pin holes are respectively provided at two opposite sides of the first central hole of the positioning plate.

7. The UAV arm mechanism, as recited in claim 6, wherein the arm connecting device comprises at least two rotating plates, wherein each of the rotating plates has a central hole, a slot is provided between the central hole and a plate edge of each of the rotating plates for disassembly.

8. The UAV arm mechanism, as recited in claim 7, wherein the first central hole of the positioning plate has a flat square shape, and the mounting plate has a central opening which is flat square shaped;
the first central hole of the positioning plate is consistent with the central opening of the mounting plate in shape, and the positioning plate and the mounting plate are disposed at a certain distance along an axis of the central opening.

9. The UAV arm mechanism, as recited in claim 8, wherein the rotating plates are a first rotating plate and a second rotating plate, the first rotating plate has a second central hole, the second rotating plate has a third central hole and second positioning pin holes;
after relatively rotating a certain angle, the second positioning pin holes of the second rotating plate of the arm connecting device are respectively corresponding to the first positioning pin holes of the positioning plate of the arm fixed device along the axis direction.

* * * * *